United States Patent
Ungchusri et al.

[19]

[11] Patent Number: 6,007,048

[45] Date of Patent: Dec. 28, 1999

[54] SATELLITE SEAL ARRANGEMENT FOR PLUG VALVE, BALL VALVE OR GATE VALVE

[75] Inventors: Tep Ungchusri, Woodlands; Roy C. Bates, Crosby; Robert L. Witt, Conroe, all of Tex.

[73] Assignee: FMC Corporation, Chicago, Ill.

[21] Appl. No.: 08/832,113

[22] Filed: Apr. 3, 1997

Related U.S. Application Data

[63] Continuation of application No. 08/654,806, May 29, 1996, abandoned, which is a continuation-in-part of application No. 08/384,726, Feb. 6, 1995, abandoned, which is a continuation-in-part of application No. 08/189,817, Feb. 1, 1994, abandoned.

[51] Int. Cl.$^6$ ....................................................... F16K 5/18
[52] U.S. Cl. ............................................ 251/309; 251/304
[58] Field of Search ..................................... 251/172, 304, 251/309

[56] References Cited

U.S. PATENT DOCUMENTS

| | | |
|---|---|---|
| 3,219,354 | 11/1965 | Kazienko . |
| 3,378,026 | 4/1968 | Oliver .................................. 251/172 X |
| 3,507,505 | 4/1970 | Muhlner et al. . |
| 3,592,491 | 7/1971 | Glover . |
| 3,916,950 | 11/1975 | Mongerson et al. . |
| 3,972,507 | 8/1976 | Grove ....................................... 251/172 |
| 4,136,710 | 1/1979 | Bond .................................. 251/172 X |
| 4,226,258 | 10/1980 | Nakanishi ............................ 251/172 X |
| 4,379,558 | 4/1983 | Pippert . |
| 4,434,967 | 3/1984 | Vanderburg . |
| 4,593,914 | 6/1986 | Johnson . |
| 4,747,578 | 5/1988 | Kivipelto et al. .................... 251/172 X |
| 5,180,008 | 1/1993 | Aldridge et al. . |
| 5,261,677 | 11/1993 | Gotoh et al. . |

FOREIGN PATENT DOCUMENTS

| | | |
|---|---|---|
| 0280805 | 9/1988 | European Pat. Off. . |
| 1166571 | 3/1964 | Germany . |
| 3338899 | 10/1984 | Germany . |
| 3621746 | 1/1988 | Germany . |
| 1338109 | 11/1973 | United Kingdom . |
| 1422011 | 1/1976 | United Kingdom . |
| 2142416 | 1/1985 | United Kingdom . |

*Primary Examiner*—John Fox

[57] ABSTRACT

A plug or gate valve including two seats shaped as cylindrical segments and having a first continuous seal surrounding the flow passage and at least one satellite seal outside the first seal to reduce the area upon which pressure acts to force the segment toward the plug or gate.

1 Claim, 4 Drawing Sheets

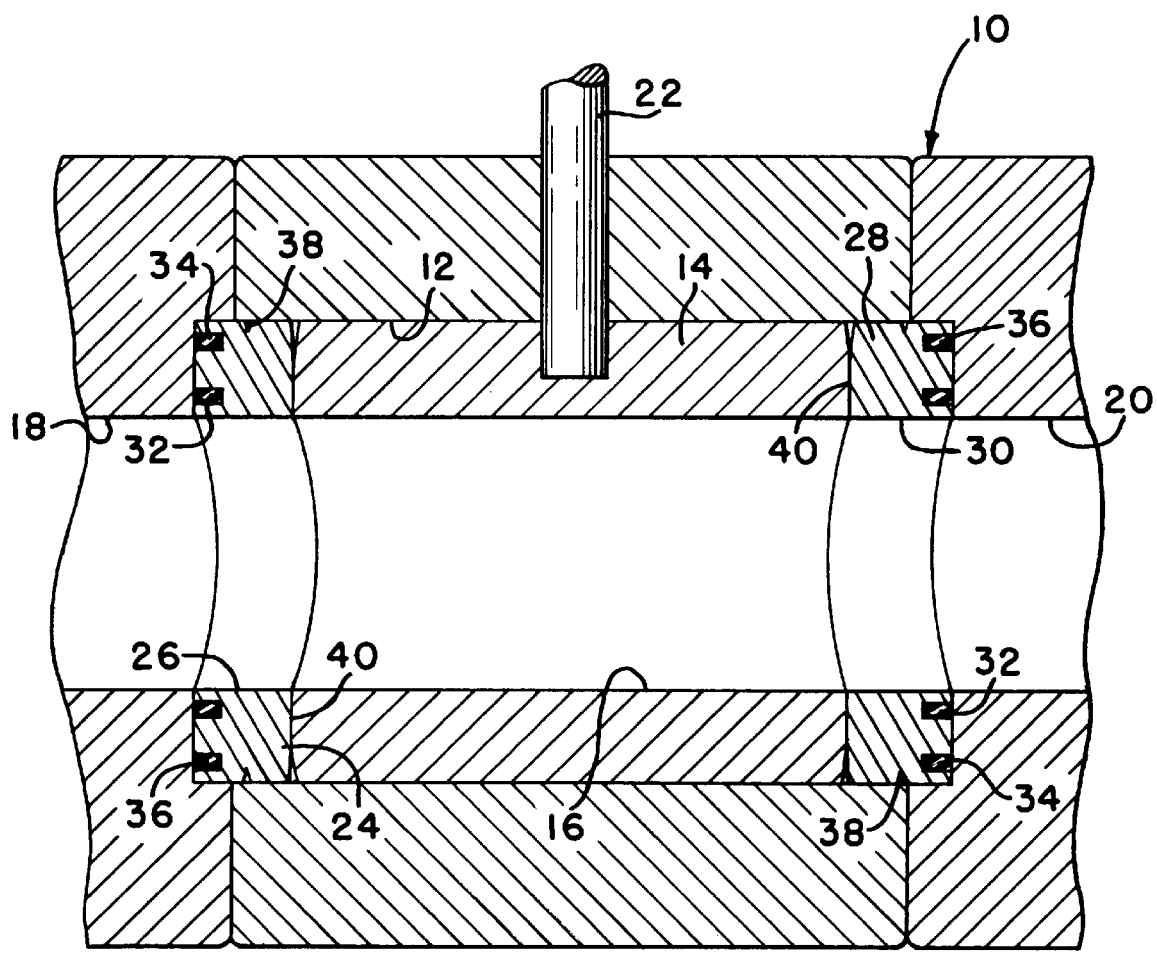
FIG_1

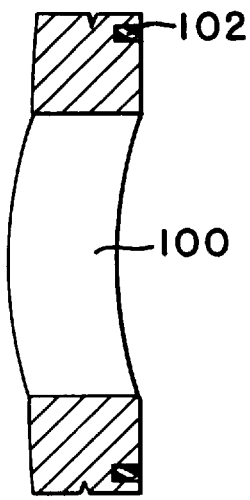
FIG_2
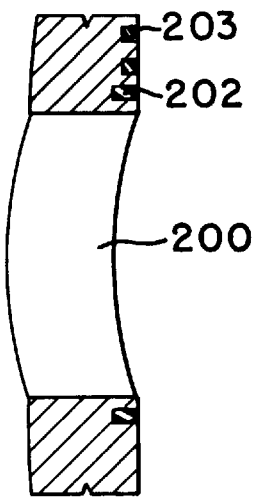
FIG_3
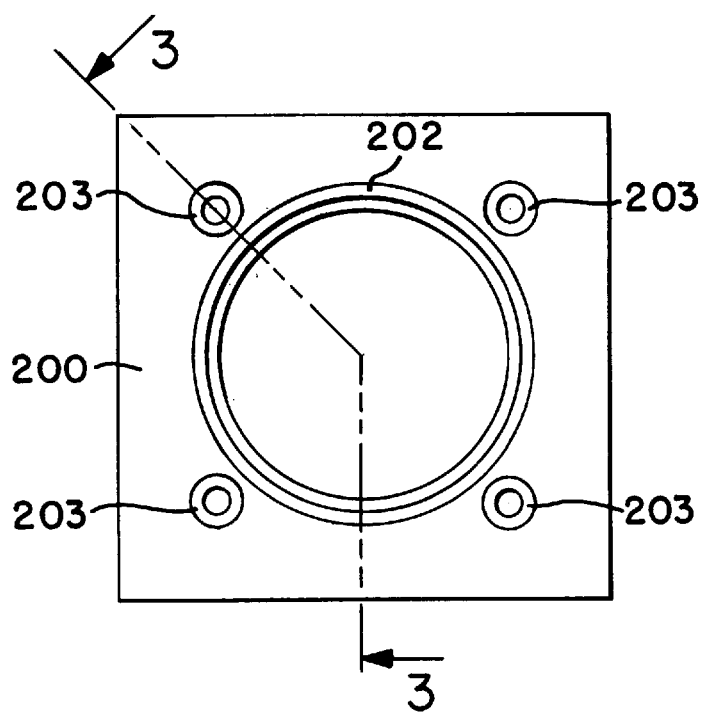
FIG_3A

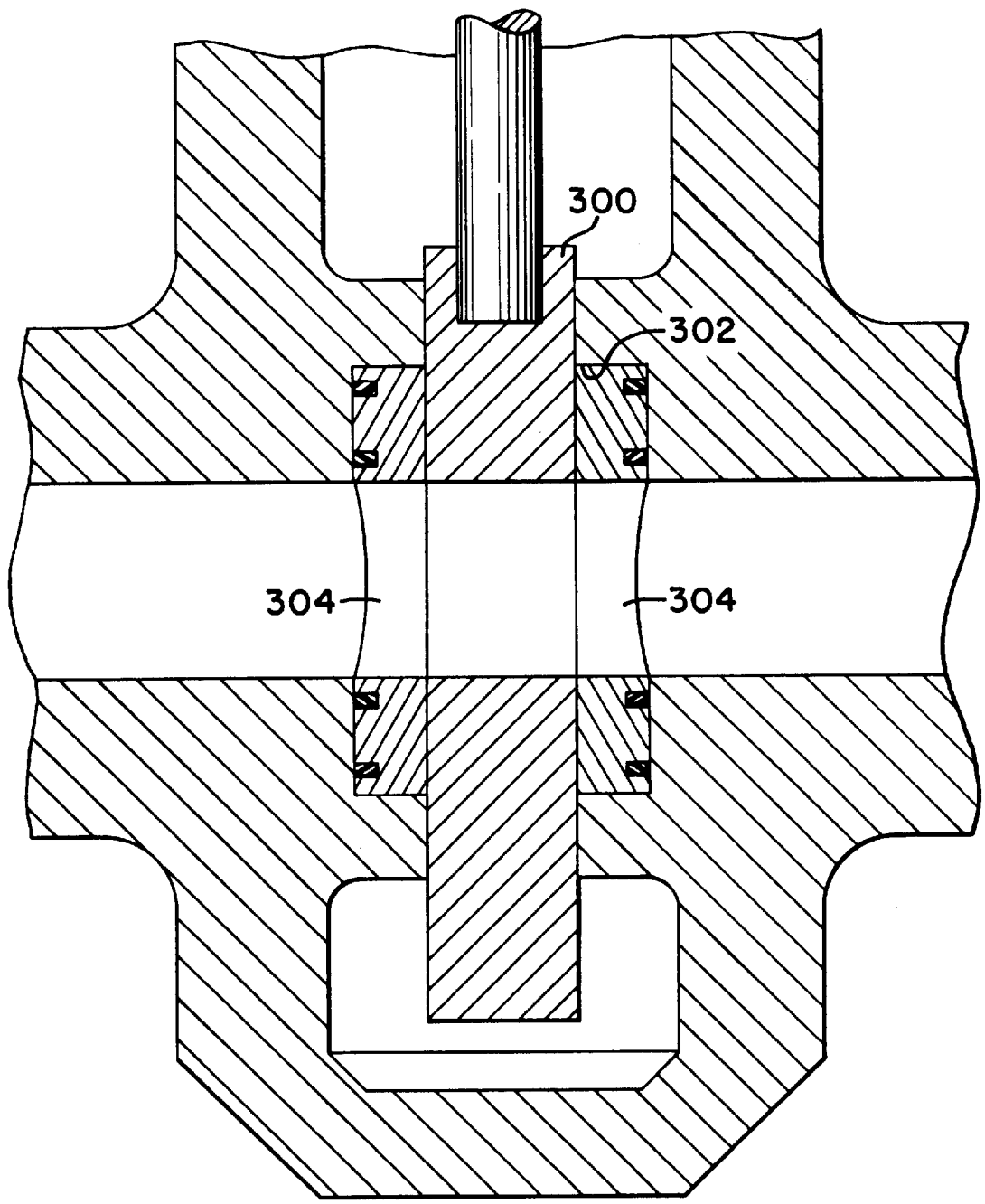
FIG_4

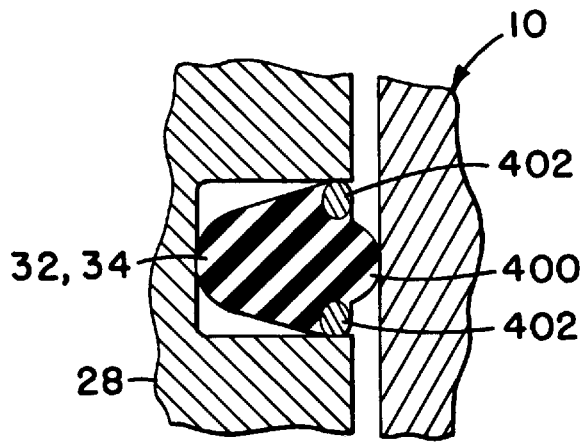
FIG_5
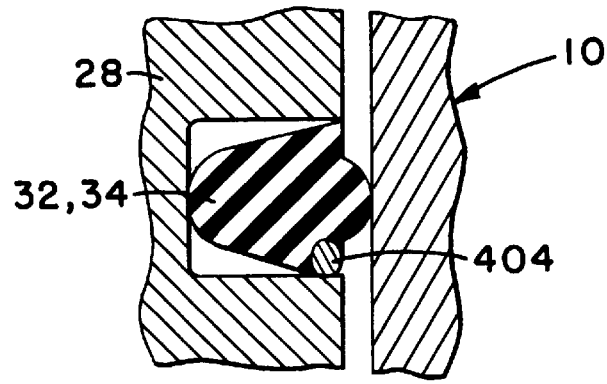
FIG_6
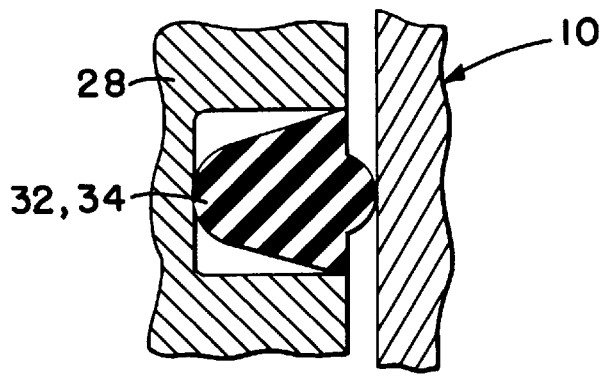
FIG_7

SATELLITE SEAL ARRANGEMENT FOR PLUG VALVE, BALL VALVE OR GATE VALVE

This is a continuation of application Ser. No. 08/654,806 filed on May 29, 1996, now abandoned, which is a continuation-in-part of application Ser. No. 08/384,726 filed on Feb. 6, 1995, now abandoned, which is a continuation-in-part of application Ser. No. 08/189,817 filed on Feb. 1, 1994, now abandoned.

BACKGROUND OF THE INVENTION

The present invention relates to valves for controlling fluid flow and, more particularly, to a valve that includes a rotatable plug or movable gate which cooperates with at least one pair of seats for controlling and sealing fluid flow.

Known valve designs include a ball or gate that is rotatably or movably mounted in a valve body and that has a through hole through which fluid flow when the hole is aligned with inlet and outlet ports. Such valves are closed when the plug or gate is rotated or moved so that a solid side of the plug or gate entirely blocks the flow path of the inlet port. The plug or gate presses against seats, one positioned on each the upstream and downstream side, which press against the valve body. Typically, the plug or gate has some float so that in a sealing situation the upstream fluid pressure causes the plug or gate to be strongly biased against the downstream seat which, in turn, is biased against the valve body forming a seal therewith.

Under the stop flow condition described above, there is ordinarily a large amount of pressure within the valve cavity which houses the plug or gate and seats because fluid under pressure enters between the plug or gate and seats. The downstream seat is strongly biased against the valve body by the fluid in the flow path which is transmitted by the plug or gate. In the event that fluid pressure is suddenly bled off upstream, the upstream seal formed between the upstream seat and the valve body will have a tendency to trap pressure in the cavity such that resultant pressure force on the upstream side of the upstream seat will cause the upstream seat to be biased against the plug or gate. This trapped pressure condition requires a significantly higher operating torque to rotate the plug or to move the gate and may result in overstress of components if a temperature change occurs while the valve is in this condition.

It is an object of the invention to design a valve that solves the aforementioned problem and, at the same time, provides a reliable seal during any mode of operation, has easily removable parts and is easily serviceable, and comprises components that are easily manufactured.

SUMMARY OF THE INVENTION

The present invention includes a valve comprising a valve body having a generally cylindrical cavity with at least one inlet port and one outlet port rotatably receiving therein a generally cylindrical plug or a gate having a through bore that can be selectively aligned with the inlet and outlet ports to define a flow path. The valve further includes at least two seats shaped as cylindrical segments and having one or more sealing means arranged to attain the aforementioned object of the invention.

BRIEF DESCRIPTION OF THE DRAWINGS

FIG. 1 is a partial, sectional view of a plug valve and seat assembly in a valve body cavity.

FIG. 2 is a sectional view of a seat having one continuous seal.

FIG. 3 is a cross-sectional view taken along line 3—3 of FIG. 3A, of a seat having one continuous seal and at least one satellite seal.

FIG. 3A is a front elevational view of the seat depicted in FIG. 3.

FIG. 4 is a partial, sectional view of a gate valve and seat assembly in a valve body cavity.

FIG. 5 is a partial, cross-sectional view of a seal.

FIG. 6 is a partial, cross-sectional view of another embodiment of a seal.

FIG. 7 is a partial, cross-sectional view of yet another embodiment of a seal.

DESCRIPTION OF THE PREFERRED EMBODIMENT

Shown in FIG. 1 is a partial, cross-sectional view of a valve body (10) having a generally cylindrical body cavity (12) housing therein a rotatable plug (14) having a through bore (16). The valve body (10) has an inlet port (18) and an outlet port (20). The plug (14) is attached to a stem (22) by conventional means for applying torque to rotate the plug (14) such that the through bore (16) is aligned with the inlet and outlet ports (18, 20) to allow flow through the valve body (10) forming a flow path. On the upstream side of the plug (14) an upstream seat (24) having a central opening (26) therethrough is positioned between the plug (14) and valve body (10). On the downstream side of the plug (14) a downstream seat (28) having a central opening (30) therethrough is positioned between the plug (14) and the valve body (10). Each seat (24, 28) is shaped generally like a cylindrical segment and has inner (32) and outer (34) sealing members. The sealing members are flexible, continuous seals that surround the flow path and form continuous seals between the seats (24, 28) and the valve body (10). The sealing members (32, 34) can be received in channels (36) on the seats (24, 28). Each seat has a notch (38) or similar means on top and bottom ends for orienting the seats during assembly.

The sealing members (32, 34) are positioned generally concentrically around the flow path such that each inner sealing member (32) has a first diameter and each outer sealing member (34) has a second diameter greater than the first diameter. Contact between the downstream seat (28) and the adjacent surface of the plug (14) occurs along an area (40) that forms a continuous metal-to-metal seal around the flow path. This area (40) will now be referred to as the sealing contact ring (40). The sealing ring area (40) is a closed, area surrounding the flow path. The sealing contact ring (40) between each seat (24, 28) and the plug (14) forms a continuous metal-to-metal seal in the form of zone contained between the first diameter defined by member 32 and the second diameter defined by member 34 that has a diameter which is greater than the first diameter and less than the second diameter for a reason which will now be discussed.

The plug (14) is arranged to float somewhat in the valve cavity such that during stop flow conditions, the upstream fluid pressure becomes trapped in the cavity and particularly between the upstream seat (24) and the adjacent surface of the plug (14). This causes the plug (14) to be biased against the downstream seat (28) which, in turn, is biased against the valve body (10) downstream. This effect is accomplished by sizing the diameter of the inner seals (32) to minimize the radial surface area, and thus the resultant downstream force caused by fluid pressure, such that the resultant downstream force is less than the opposite-acting upstream force acting on the downstream side of the upstream seat (24). In particular, on the upstream seat (24), by sizing the diameter of the inner seal member (32) small enough, and by sizing the diameter of the outer seal member (34) large enough, resultant force acting on the seat (24) in the downstream direction is minimized. This is because the inner and outer sealing members (32,34) prevent fluid from entering the upstream radial surface enclosed between them. Thus, the only radial areas subject to fluid pressure are the inner area (35) between the central opening (26) and the inner seal member (32), and the outer area (37) between the outer seal member (34) and the outermost radial edge of the seat (24). Therefore, the resultant force biasing the upstream seat (24) in the downstream direction is a function of the fluid pressure acting on the upstream radial surfaces (35, 37). The opposite-acting upstream force acting on the downstream side of the seat (24) is a function of fluid pressure acting on the downstream side of the seat (24) multiplied by the radial surface area of a section of the same radial surface, said section being the area between the central opening (26) and the seal diameter formed by the sealing contact ring (40). Such sizing ensures that the resultant forces from flow path pressure acting between the seats (24, 28) and the valve body (10) is less than the opposite-acting force caused by pressure acting on the seats (24, 28) between the seats (24, 28) and the plug (14).

The downstream seat (28) and corresponding seal members (32,34) are similarly configured to also ensure that the resultant forces from flow path pressure acting; between the seats (24, 28) and the valve body (10) is less than the opposite-acting force caused by pressure acting on the seats (24, 28) between the seats (24, 28) and the plug (14). By sizing the outer seal (34) diameter to be greater than the plug-seat diameter, a large force due to cavity pressure which exists in the valve cavity (12) outside the flow path is prevented from acting between the valve seats (24, 28) and the valve body (10). The sealing members (32, 34) in the upstream seat (24) bias the upstream seat (24) against the plug (14). Normally, the plug (14) and downstream seat (28) are biased against the valve body (10) downstream.

When the valve plug (14) is in a closed position and fluid pressure is suddenly bled off upstream, the upstream seal formed between the upstream seat (24) and the valve body (10) will have a tendency to trap pressure in the cavity (12) such that resultant pressure force on the upstream side of the upstream seat (24) will cause the upstream seat (24) to be biased against the plug (14). To prevent this trapped pressure condition which requires a significantly higher operating torque to rotate the plug (14) and which may result in overstress of components if a temperature change occurs while the valve is in this condition, it is critical that the outer seal member (34) has a greater diameter than the plug-seat seal or sealing contacting ring (40) as discussed above, to reduce the resultant force of trapped cavity pressure on the seat (24).

Another embodiment of the seats (100) as shown in FIG. 2 requires only one seal member (102) for applications involving relatively small diameter flow paths where contact between an upstream seat and a plug would result in friction forces of relatively low magnitude such that required operating torque would not be excessive. In this embodiment, it is essential that the diameter of the seal (102) be greater than the plug-seat seal diameter to prevent large forces from cavity pressure between the seat and valve body (10).

In another embodiment of the seats (200) as shown in FIGS. 3 and 3A, one seal member (202) having a diameter smaller than the diameter of the plug-seat seal acts as described above with reference to FIG.1. One or more satellite seals (203) in the form of continuous, closed, flexible seals outside the circumference of the inner seal (202) act to prevent cavity pressure from acting over the entire area of the seat surface so as to reduce the resultant force. The number and size of such seals (203) can be selected to prevent the resultant force from overcoming the remaining cavity pressure and causing the seat to be biased against the plug.

The embodiment of FIG. 4 shows the present invention utilizing the seat seal arrangement of FIG.1 with a gate (300) of a gate valve. A cylindrical cavity (302) and seats (304) having cylindrical outer contours are utilized. The operation is essentially the same as that of the embodiment described with reference to FIG. 1.

FIG. 5 shows one form of the inner and outer seal members (32, 34) having a cross-sectional shape with a convex portion (400) adapted to contact the valve body (10) and anti-extrusion elements (402). FIG.S 6 and 7 illustrate the seal member (32,34) with one anti-extrusion element (404) and no anti-extrusion element, respectively. Other suitable cross-sections may be used.

In the seat embodiments using inner and outer seal members (32,34), it is advantageous to provide a small drilled hole adjacent to and in communication with the outer seal groove (36) to alleviate pressure build-up between inner (32) and outer (34) seals caused by grease or the like used during installation.

While a preferred embodiment has been described and shown, it is understood that variations and modifications can be made without departing from what is regarded as the scope and spirit of the invention.

We claim:

1. A valve which comprises:

a valve body comprising an interior cavity, an inlet port and an outlet port;

first and second valve seats positioned in the cavity, the first and second seats each comprising an opening aligned with the inlet and outlet ports to define a flow passage through the valve body;

a valve closure member disposed within the cavity between the first and second seats and comprising a throughbore, the closure member being movable between a first position wherein the throughbore is in alignment with the openings to thereby open the flow passage and a second position wherein the throughbore is out of alignment with the openings to thereby close the flow passage;

a first continuous seal surrounding the flow passage and positioned between the first seat and the valve body, the first continuous seal defining a first seal area surrounding the flow passage; and at least one satellite sealing means located between the first seat and the valve body beyond the first continuous seal for forming a closed continuous satellite seal area between the first seat and the valve body which does not encompass either the flow passage or the first seal area.

* * * * *